United States Patent [19]

Saltzman et al.

[11] Patent Number: 4,878,953

[45] Date of Patent: Nov. 7, 1989

[54] METHOD OF REFURBISHING CAST GAS TURBINE ENGINE COMPONENTS AND REFURBISHED COMPONENT

[75] Inventors: Gilbert A. Saltzman, Howell; Timothy A. Wertz, Manahawkin; Ira L. Friedman, Rumson, all of N.J.

[73] Assignee: Metallurgical Industries, Inc., Tinton Falls, N.J.

[21] Appl. No.: 143,513

[22] Filed: Jan. 13, 1988

[51] Int. Cl.$^4$ ............................................. C21D 1/09
[52] U.S. Cl. ...................................... 148/4; 148/903; 228/119
[58] Field of Search ................... 148/4, 903, 152, 902; 217/121.57, 121.36, 76.16; 428/679, 678; 228/119

[56] References Cited

U.S. PATENT DOCUMENTS

| | | | |
|---|---|---|---|
| 4,050,133 | 9/1977 | Cretella et al. | 148/4 |
| 4,098,450 | 7/1978 | Keller et al. | 148/4 |
| 4,141,127 | 2/1979 | Cretella et al. | 228/119 |
| 4,219,592 | 8/1980 | Anderson et al. | 428/679 |
| 4,285,459 | 8/1981 | Baladjanian et al. | 228/119 |
| 4,689,463 | 8/1987 | Shubert | 219/121.57 |
| 4,705,203 | 11/1987 | McComas et al. | 228/119 |

*Primary Examiner*—S. Kastler
*Attorney, Agent, or Firm*—Kenyon & Kenyon

[57] ABSTRACT

The refurbishing process permits an overlay to be formed on a casting to repair cracks, distortions and the like as well as to build up undersized sections. During refurbishing, a plasma arc is established under an electric current of less than 30 amps to form a shallow pool of molten metal on a casting. Powdered metal is delivered slightly above the molten pool and, subsequently, the melted powder and molten pool solidify to an overlay having a high integrity, cast structure which is metallurgically bonded to the casting with minimal dilution.

12 Claims, 3 Drawing Sheets

Fig.1.
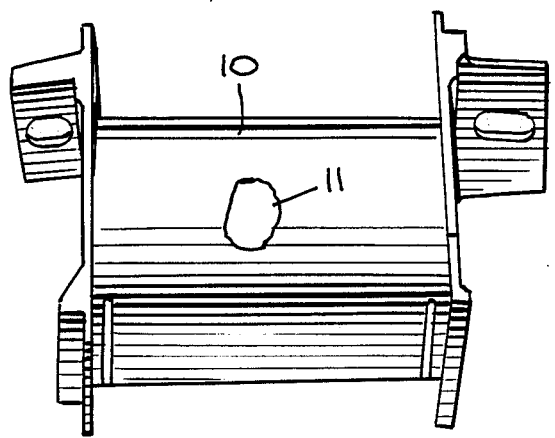
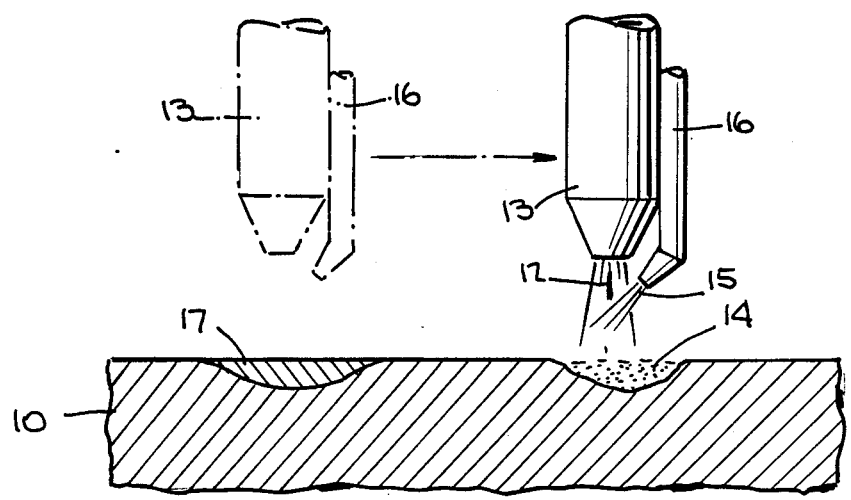
Fig.2.

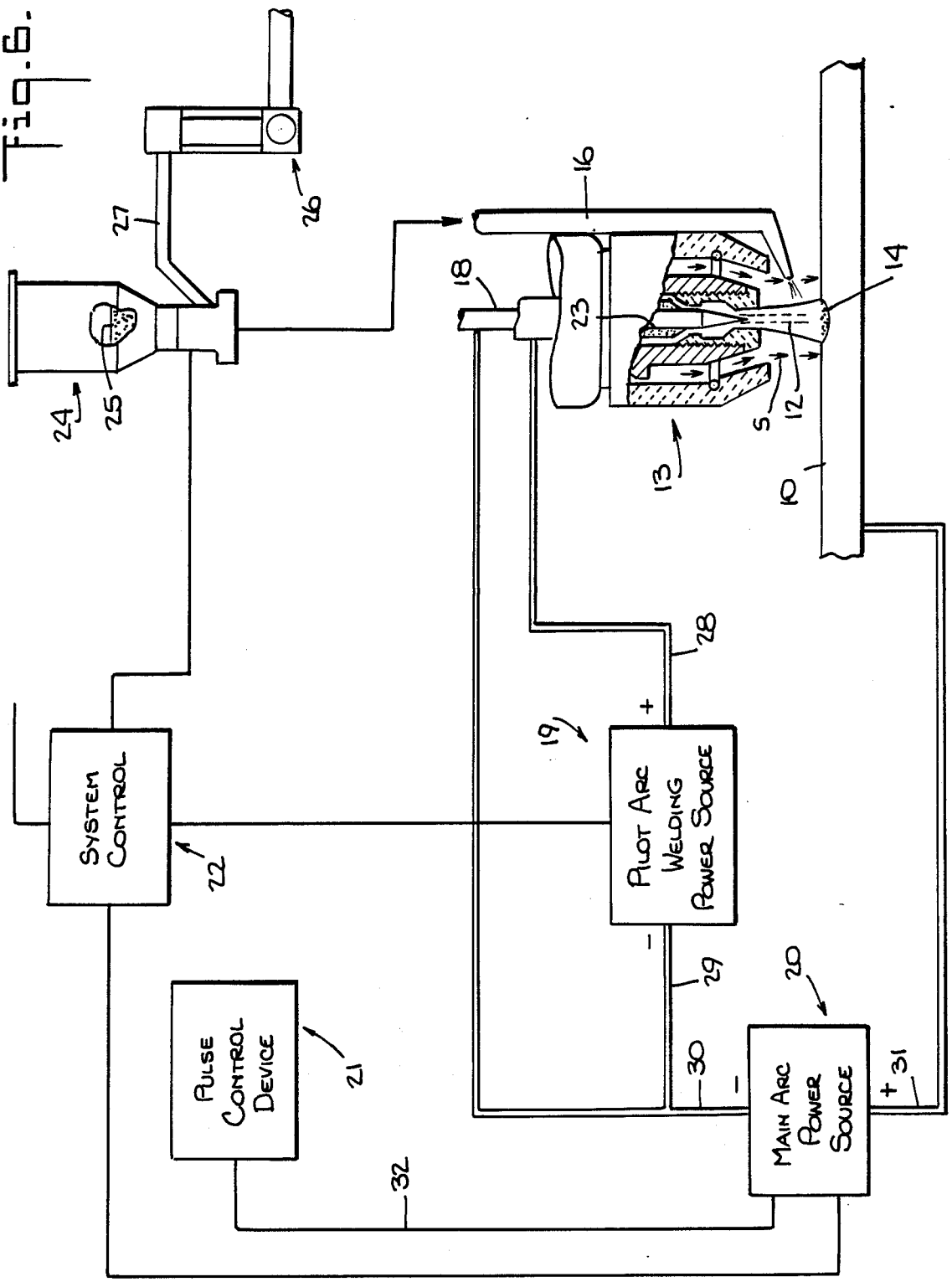

METHOD OF REFURBISHING CAST GAS TURBINE ENGINE COMPONENTS AND REFURBISHED COMPONENT

This invention relates to a method of refurbishing cast gas turbine engine components and components refurbished thereby.

Heretofore, it has been known to use nickel-base, cobalt-base and iron-base superalloys in the hot sections of gas turbine engines for components exposed to high temperature operating conditions. Generally, these components which are highly resistant to deformation at high temperature are produced by the investment casting process. As is also known, because of the nature of the alloys and the complexity of the shapes of the components, the cost of such castings can be relatively high. Thus, should any of the components be incorrectly cast or otherwise damaged during fabrication, there can be a substantial amount of waste incurred. In order to avoid this, the casting operations and procedures have required close control and supervision in order to ensure against obtaining components which cannot be used.

Despite the controls which are imposed during casting, defects such as shrinkage, inclusions, porosity and cracks, can occur during a casting process. During machining of the casting, dimensions may be produced which are outside of those specified.

Gas turbine engine hot section components may also suffer damage or degradation in operation. This may be in the form of dimensional losses due to erosion, oxidation or corrosion, cracking or distortion. When an engine is overhauled, these components are either replaced by new parts or repaired. For example, if a satisfactory repair can be made for less than about 70% of the price of a replacement part, a cost savings may be achieved. To this end, a number of repair methods have been developed utilizing metal spraying, brazing and welding. The metal spraying process most frequently used involves a plasma heat source and powder consumables. However, the metal spraying process has dimensional limitations. For example, metal spraying is most suitable for providing relatively thin coatings and cannot be used to repair relatively large deep geometric discontinuities. Unless conducted under vacuum or inert atmospheric conditions, plasma spraying will not produce metallurgically bonded, high integrity overlays. Thus, even though satisfactory for the geometry of the repair in question, such repairs do not provide high strength deposits without expensive environmental chambers or necessary additional processing steps. One method involving metal spraying for refurbishing airfoil-shaped parts is described in U.S. Pat. No. 4,050,133. This involves a two step sintering process with one step under high pressure to achieve dense well bonded added material after spraying.

Braze repairs by their nature involve materials with melting points that are lower than that of the superalloy material being repaired. U.S. Pat. No. 4,098,450, for example, teaches the use of a nickel-base brazing alloy for engine components. Another method described in U.S. Pat. No. 4,285,459 uses mixtures of lower melting point brazing alloys with a powder having the same composition as the superalloy component being repaired. In both cases, the resulting repair does not have the same heat and/or environment resisting properties as the alloy being repaired. U.S. Pat. No. 4,478,638 describes use or a mixture of two alloy powders in which the second powder has a composition substantially within the composition range of the first, except for the inclusion of boron and/or silicon as melting point depressants. In this case, the oxidation and corrosion resistance of the superalloy component is not degraded; however, the braze repair has lower high temperature strength than the repaired article.

Weld repairs are used on certain cast superalloys. Gas tungsten arc welding (GTAW), plasma arc welding (PAW) and wire-feed electron beam (EB) processes amongst others, using ductile filler materials, such as IN625, can be performed manually or automatically. However, heat input has to be very carefully controlled because the higher strength superalloys are highly sensitive to hot cracking and microfissuring during welding and to subsequent cracking during heat treatment in the heat affected zone. For this reason, certain of these alloys, such as IN713C, IN738LC and IN100 are considered as nonweldable. In less crack sensitive materials, such as IN718, weld repairs are performed with ductile fillers such as IN625, but these do not provide the high temperature strength properties required in many structural components.

Accordingly, it is an object of the invention to reduce the number of unusable expensive castings in the manufacture of gas turbine engine components and the like.

It is another object of the invention to refurbish cast superalloy components in a relatively simple economical manner.

It is another object of the invention to be able to refurbish superalloy gas turbine components such as vane castings, structural castings, combustors, turbine blades and the like.

It is another object of the invention to be able to salvage relatively expensive cast superalloy components that have been previously scrapped.

It is another object of the invention to weld, repair or refurbish superalloy components previously considered unweldable.

It is another object of the invention to provide refurbished superalloy components that have sufficiently high temperature strength to be used in hot section structural applications.

It is another object of the invention to produce metallurgically bonded homogeneous cast superalloy weld repairs having the same composition as that of the cast superalloy component being refurbished.

Briefly, the invention provides a process of refurbishing a superalloy casting as well as a refurbished superalloy component.

In accordance with the process, a plasma arc is generated between an electrode and a section of the superalloy casting which is to be refurbished under an electric current of less than 30 amps derived from a high frequency response constant current power supply sufficient to melt a surface layer in a small area of the casting section into a shallow pool of molten metal without detrimentally heating the casting. In addition, a controlled amount of welding powder is delivered into the arc at a point slightly above the molten pool for heating and delivery to the molten pool. Thereafter, the delivered powder and molten pool are permitted to solidify into an overlay which is characterized in having a high integrity, cast structure being metallurgically bonded to the casting.

The generation of the plasma arc may be performed in a manner as described in U.S. Pat. No. 4,689,463 or pending U.S. patent application Ser. No. 833,213, filed Feb. 25, 1986. In this respect, the electric current may be pulsed between a main current level and a lower auxiliary current level with the main current level being sufficient to form the molten pool and to fuse the delivered powder while the lower auxiliary current level is sufficient to permit solidification of the pool.

The low amperage used in generating the plasma arc may fall into a range of from 0.5 to 30 amps depending upon the size of the surface area being melted by the plasma arc, the substrate mass or chill available to remove heat from the overlaid surface, the desired amount of weld build-up, and the sensitivity of the substrate composition to hot cracking, microfissuring, or other deleterious effects. If a pulsed current mode is used, with a 10 to 40 millisecond pulse time, the average current may fall into a range of from 3 to 20 amps.

The process may be used to refurbish a superalloy in various manners. For example, cracks, voids, blowholes and the like may be repaired by a "filling in" of the casting section having such defects. Also, where the casting has sections which are undersized in relation to the remainder of the casting, the sections may be built-up to the proper sizes.

The refurbished superalloy component provided by the invention includes a casting of superalloy material and at least one refurbished section of overlay material on the casting which has a high integrity, fine grained cast structure, metallurgically bonded to the casting and which is characterized in having high temperature strength similar to that of the parent casting for use in hot section structural applications.

In accordance with the invention, the overlay material and the casting may be made of identical compositions. For example, each may be made of the same nickel-base, cobalt-base or iron-base superalloy. The overlay material may also be of a composition similar to the casting, but having less tendency to crack due to modifications in elemental constituents which promote the "nonweldable" conditions.

The overlay material may also form a corrosion-resistant surface or a wear-resistant surface on the casting through the use of alloy compositions quite dissimilar to that of the substrate.

These and other objects and advantages of the invention will become more apparent from the following detailed description taken in conjunction with the accompanying drawings wherein:

FIG. 1 schematically illustrates an engine vane having a defect area prepared for a weld repair;

FIG. 2 schematically illustrates a view of a welding apparatus for repairing the vane of FIG. 1 in accordance with the invention;

FIG. 6 schematically illustrates an apparatus for employing the process of the invention.

Figure 3:
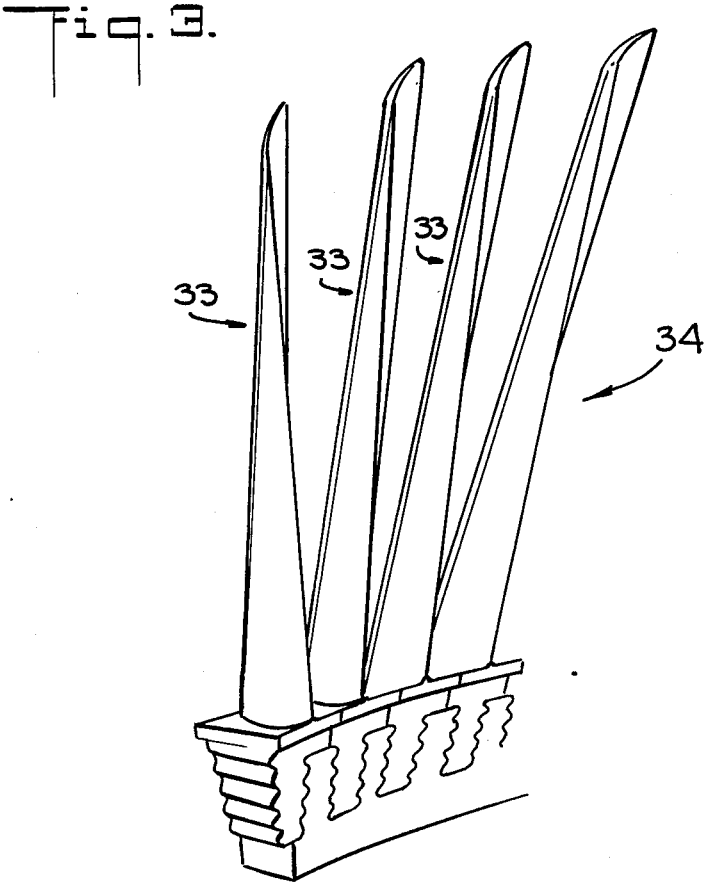
FIG. 3 illustrates a perspective view of a gas turbine engine blades in a rotor assembly.

Referring to FIG. 1, the cast engine vane 10 has a defect area 11 which has been prepared for a weld repair. In this respect, the defect may have been in the form of a crack, inclusion, blow-hole, or the like which requires repair.

As is known engine vanes are usually cast from superalloys, for example a nickel-base alloy, a cobalt-base alloy or an iron-base superalloy. In the case of nickel-base superalloys, these are frequently compositions primarily strengthened by precipitation of a gamma prime phase, $Ni_3$ (Al, Ti). In addition, the casting of turbine blades is frequently performed so as to produce a directionally solidified part, with grains aligned parallel to the axis of the blade, or a single crystal part, with no grain boundaries.

In order to repair the defect 11, a refurbishing process is performed which is primarily aimed at depositing the same superalloy material on the casting (substrate).

Referring to FIG. 2, in accordance with the process, a plasma arc 12 is generated between an electrode (not shown) within a torch 13 and a section of the vane (casting) 10 to be refurbished. This arc 12 is generated under a direct electric current of less than 30 amps sufficient to melt a surface of the vane 10 into a shallow pool 14 of molten metal without detrimentally heating the vane 10. In addition, a controlled amount of welding powder 15 is delivered into the arc 12 at a point slightly above the molten pool 14 for heating and delivery to the pool 14. As indicated, the powder 15 is delivered via a tube 16 positioned alongside the torch 13 and angled inwardly towards the arc 12. After delivery of the powder 15 into the molten pool 14, the powder and pool are permitted to solidify into an overlay 17 (as indicated to the left in FIG. 2) which is characterized in having a high integrity, fine grained cast structure metallurgically bonded to the casting 10.

The term "high integrity cast structure" defines a nearly 100% dense overlay as opposed to thermal spray coatings which contain some greater degree of porosity, voids or similar micro-defects.

Referring to FIG. 6, the welding apparatus is similar to that described in U.S. Pat. No. 4,689,463 and includes the torch 13, a non-consumable electrode 18, a pilot arc welding power source 19, a main arc power source 20, a pulse control device 21 (optional) and a system controller 22.

The torch 13 is of generally conventional construction and, as shown in FIG. 6, includes a central passage 23 for receiving the electrode 18. Still further, a powdered metal delivery device 24 which contains a reservoir of powdered metal material 25 is connected to the tube 16 in order to supply powdered metal thereto. In addition, a flow control and metering device 26 is connected via a gas line 27 to the powdered metal delivery device 24 in order to convey an inert gas, such as argon, into the tube 16 from a suitable source (not shown) in order to aid the conveyance of the powdered metal. The gas delivered to the delivery device 24 is used to assist gravity in transporting the powdered metal to the arc 12 while also protecting the powdered metal from atmospheric contamination. This gas also adds to the overall gas volume and composition at the weld zone.

The pilot arc welding power source 19 is connected to and between the electrode 18 and the torch 13 by suitable cables 28, 29, respectively. The pilot arc welding power source 19 provides the welding current necessary to establish an electric arc between the electrode 18 and the orifice of the torch 13.

The main arc power source 20 is connected to and between the electrode 18 and the substrate 10 via cables 30, 31 in order to provide the welding current to establish an arc between the electrode 18 and the casting 10.

The pulse control device 21 is connected to the main arc power source 20 via a suitable cable 32 in order to control the amplitude and duration of the power supplied from the main arc power source 20 to the electrode 18 and casting 10. In this respect, the pulse control device 21 operates so that the current is delivered between a main current level and a lower auxiliary level with each over a programmed duration of time.

A system controller 22 may be connected to the respective power sources 19, 20, powdered metal delivery device 24 and the various flow control and metering devices 26 to synchronize the operation of these components. Alternately, the control of these devices may be conducted manually.

The electric welding arc 12 is supplemented by a partially ionized gas or plasma column through which the arc 12 passes. In addition, an inert gas shield surrounds the plasma column and is provided to protect the molten metal pool 14 from atmospheric contamination or oxidation.

The power supply and the control of the powder and gas feed allows a deposit of a highly controlled overlay on the casting 10 with a minimum amount of dilution and a minimum amount of heat affect or distortion of the casting 10. A constant current power supply with a frequency response of 500 Hertz or greater is preferred.

By reducing the amount of amperage, the torch to work piece distance can be reduced. By reducing this, and by proper selection of the torch orifice or tip size, the position of the can be focused or pinpointed. This, in turn, permits the area into which the powder is to be deposited to be accurately defined. Thus, the powder delivery can be made into the plasma arc 12 slightly above the vane 10 so that a more effective use of the heat of the arc can be made to melt the powder without dissipating the entire heat of the arc into the substrate.

Further, control is afforded through the use of the pulse control device 21 connected to the main arc power source 20 for pulsing the welding current in order to control the amplitude and duration of the power supplied from the main arc power source 20. The control device 21 serve to pulse the current between a main current level and a lower auxiliary current level on a periodic basis. The main current level or amplitude is provided to create a weld puddle 14 on the vane 10 and to fuse the powdered metal. The auxiliary current level or amplitude is provided to allow the previously created puddle 14 to solidify thus creating a series of overlapping weld deposits. Variations in the current amplitude as well as the amplitude duration provide a very precise control over the weld deposit geometry and reduced heat input to the substrate material. Further control of heat input to the substrate and of weld deposit geometry is provided by using an appropriately sized orifice in the welding torch tip, so as to modify the plasma column size.

With the process, it has been found unnecessary to utilize high amperages to melt significant quantities of overlay material. Instead, the heat input is precisely controlled and made more effective so as to melt the delivered powder while minimizing melting, distortion and adverse affects of the substrate. In this regard, the amperage is precisely controlled and the plasma column is focused on the substrate or on previously deposited weld metal. For example, the amperage may be in the range of from 0.5 amps to 30 amps. In addition, there is a precise control of the delivery of the powder into the plasma arc and, thus, delivery to the weld puddle by a control of the amount of gas flow in and around the arc.

With pulsed arc welding current, a 10 to 40 millisecond pulse time is used, and the average current level may fall into a range from 3 amps to 20 amps. By introducing powder into the plasma column, the major portion of the heat input supplied by the welding torch can be utilized to melt the powder and only minimum amounts of this heat are directed into the substrate material. This reduces melting of the substrate material and heat transfer thereto.

On deposits where multiple layers are required, the previous overlay becomes the substrate. Minimum melting of the substrate occurs and the overlay material can be built up layer by layer to the desired size.

An added benefit of this technique is that due to the very efficient use of welding heat input, the weld deposits solidify very rapidly. Also, finer grain structures have been observed in many evaluated alloys utilizing this technique than in these alloys deposited using typical welding methods. In some instances, upon solidification, the grains or crystals formed in the deposited metal grow with the same crystallographic orientation as in the grains in the substrate metal, i.e., epitaxially. This is highly desirable for structural strength and uniformity of properties.

Because of the flexibility in material selection provided by the process, as a result of its use of powder consumables, it can be used to deposit modifications of the parent material to obtain special properties.

The process is not limited to simply building up existing materials. For example, the process may also be used for applying various corrosion-resistant or wear-resistant deposits that do not require the same high temperature strength as the substrate. An example is IN625, applied as a repair to IN713C.

The process provides crack-free weld repairs in crack-sensitive superalloy castings. The process also provides distortion-free repairs of low-mass (thin or narrow cross-section) sections on castings. The process can be conducted without the need for complex, expensive controlled atmosphere or vacuum chambers.

The process may also be used for depositing formulations of materials which have hard refractory carbides or other hard particles incorporated in a corrosion-resistant or wear-resistant alloy matrix. As such, the process can be used to make very high wear-resistant surface or possibly an abrasive cutting surface, depending upon the degree of alloying which is allowed to take place, as well as the amount of hard particulate material employed in terms of size, shape, and distribution within a deposit.

The method may be conducted manually, by semiautomatic means, or fully automated with a programmable, multi-axis robot. An example of a cast superalloy component that utilizes both manual and robotic applications is a gas turbine engine vane segment made from Rene 77, an alloy having a nominal composition, by weight of, 15% Cr, 15% Co, 4% Mo, 4% Al, 3% Ti, 0.07% C, 0.04% Zr, 0.016% B, with the balance essentially Ni, which can be overlayed with the same alloy on mismachined areas. Other locations that may require repair due to mismachining or casting defects, may be weld repaired with Rene 77.

Figure 4:
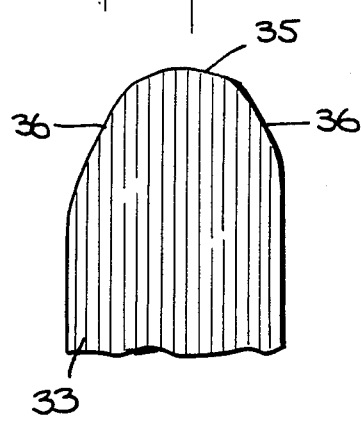
FIG. 4 illustrates a tip of a turbine blade which has worn edges.
Figure 5:
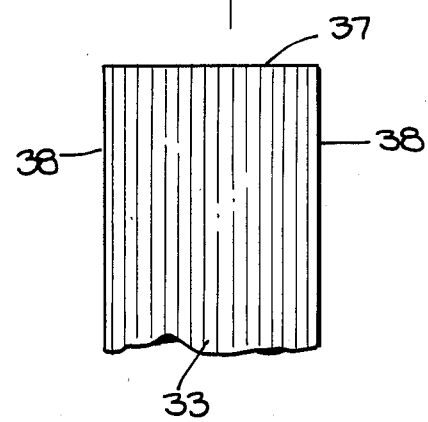
FIG. 5 illustrates a refurbished blade tip in accordance with the invention.

Referring to FIGS. 3–5, turbine blades 33 of a turbine assembly 34 which may undergo wear at the distal end, for example on tip surface 35 and/or the leading and trailing edge surfaces 36 may be refurbished in accordance with the above techniques. For example, overlay material may be applied to each worn surface 35, 36, as above described, to build up these surfaces to the original size or slightly more than the original size. Thereafter, the overlay surfaces 37, 38 may be ground, polished or otherwise treated to bring the blade tip to the desired final size.

The refurbishing procedure is not limited to turbine engine blades and vanes. For example, the procedure can be applied to many components, including turbine wheels, turbine engine exhaust cases, air seal rings, seal fins, and the like.

The disadvantages of repair and refurbishment methods for superalloy gas turbine components, utilizing metal spraying, brazing and welding methods are in large part obviated by the present invention. The ability of the method to achieve such weld repairs is in great part due to the very low heat input required to melt the powder filler alloy and achieve a metallurgical bond relative to other arc welding processes.

The process may be used to build-up castings that are dimensionally undersize, for example depressions or holes resulting when insufficient metal flows into a given section of a mold, requiring a relatively large quantity of weld metal to be applied. It may also be used to repair porosity or cracks in castings by first grinding out the material containing the porosity or crack, then filling in the cavity so formed with the parent metal. This process may also be used to build up narrow sections which require only a small quantity of weld bead geometry. It may also be used to build up thin layers on mismachined surfaces that are only slightly undersize.

The process is particularly useful in the refurbishing of nickel-base superalloys primarily strengthened by precipitation of a gamma prime phase, $Ni_3$ (Al, Ti). Superalloys which have heretofore been characterized as nonweldable, such as IN713C, IN738LC and IN100 as well as Rene 77 are within this class of superalloys.

By way of examples, where the casting (substrate) is made of IN713C, the overlay may be made of IN713C or IN713LC or a modified version of IN713LC with certain elements that cause cracking sensitivity, such as titanium and aluminum, reduced to lower levels. In another case, for a turbine blade tip and edge repair both the substrate and overlay may be IN100, a nickel-base alloy having a nominal composition, by weight, of 10% Cr, 15% Co, 5.5% Al, 4.7% Ti, 3.0% Mo, 1% V, 0.17% C, 0.06% Zr, 0.015% B, with the balance essentially Ni. The vane in FIG. 1 may also be made of and repaired with IN713C, a nickel-base alloy having a nominal composition, by weight, of 12.5% Cr, 4% Mo, 2% Cb, 6.1% Al, 0.8% Ti, 0.12% C, 0.10% Zr, 0.012% B, with the balance essentially Ni.

The invention also provides a refurbished superalloy component wherein the overlay material is subject to relatively little dilution and the heat affected zone is minimized. Dilution depends upon the size of the substrate and the amount of overlay being applied but typically is 10% or less.

The refurbished section of the casting may be characterized in several ways. For example, the overlay may be made of the same composition as the casting; the overlay may have the same high temperature and strength properties as the casting; the amount of dilution of the overlay and penetration of the substrate is a minimum; the overlay is metallurgically bonded to the casting; the overlay is in essence a high integrity casting; and the heat affected zone (HAZ) of the casting adjacent the overlay is at a minimum.

The nominal compositions of nickel-base alloys in weight percent is given in the following table by way of example.

| MATERIAL | Ni | Cr | Co | Mo | W | Ta | Cb | Al | Ti | Fe | C | B | Zr | Others |
|---|---|---|---|---|---|---|---|---|---|---|---|---|---|---|
| IN-718 | 52 | 19.0 | — | 3.0 | — | — | 5.2 | 0.6 | 0.8 | 18.5 | 0.05 | 0.006 | — | — |
| Inconel X-750 | 73 | 15.5 | — | — | — | * | 1.0* | 0.7 | 2.5 | 7.0 | 0.05 | — | — | — |
| Waspaloy | 57 | 19.3 | 14.0 | 4.3 | — | — | — | 1.4 | 3.0 | 1.0 | 0.05 | 0.005 | 0.06 | — |
| Rene' 41 | 55 | 19.0 | 11.0 | 10.0 | — | — | — | 1.5 | 3.2 | — | 0.08 | 0.006 | — | — |
| Udimet 520 | 57 | 19.0 | 12.0 | 6.0 | 1.0 | — | — | 2.2 | 2.8 | — | 0.08 | 0.007 | — | — |
| IN-939 | 48 | 22.5 | 19.0 | — | — | 2.0 | 1.4 | 1.0 | 1.9 | 3.7 | — | 0.15 | 0.009 | 0.10 | — |
| Udimet 500 | 50 | 19.0 | 19.0 | 4.0 | — | — | — | 3.0 | 3.0 | 2.0 | 0.08 | 0.005 | — | — |
| MAR-M 247 | 60 | 8.2 | 10.0 | 0.6 | 10.0 | 3.0 | — | 5.5 | 1.0 | — | 1.16 | 0.020 | 0.09 | 1.5 Hf |
| IN-738LC | 61 | 16.0 | 8.5 | 1.7 | 2.6 | 1.7 | 0.9 | 3.4 | 3.4 | — | 0.10 | 0.010 | 0.05 | — |
| IN-738 | 61 | 16.0 | 8.5 | 1.7 | 2.6 | 1.7 | 0.9 | 3.4 | 3.4 | — | 0.17 | 0.010 | 0.10 | — |
| IN-713LC | 75 | 12.0 | — | 4.5 | — | — | 2.0 | 5.9 | 0.6 | — | 0.05 | 0.010 | 0.10 | — |
| IN-713C | 74 | 12.0 | — | 4.5 | — | — | 2.0 | 6.1 | 0.8 | — | 0.12 | 0.012 | 0.10 | — |
| MAR-M246 | 60 | 9.0 | 10.0 | 2.5 | 10.0 | 1.5 | — | 5.5 | 1.5 | — | 0.15 | 0.015 | 0.05 | — |
| B-1900 | 65 | 8.0 | 10.0 | 6.0 | — | 4.0 | — | 6.0 | 1.0 | — | 0.10 | 0.015 | 0.10 | — |
| MAR-M 200 | 60 | 9.0 | 10.0 | — | 12.5 | — | 1.0 | 5.0 | 2.0 | — | 0.15 | 0.015 | 0.05 | — |
| Rene' 77 | 58 | 14.6 | 15.0 | 4.2 | — | — | — | 4.3 | 3.3 | — | 0.07 | 0.016 | 0.04 | — |
| IN-792 | 61 | 12.4 | 9.0 | 1.9 | 3.8 | 3.9 | — | 3.1 | 4.5 | — | 0.12 | 0.020 | 0.10 | — |
| Rene' 80 | 60 | 14.0 | 9.5 | 4.0 | 4.0 | — | — | 3.0 | 5.0 | — | 0.17 | 0.015 | 0.03 | — |
| Rene' 100 | 61 | 9.5 | 15.0 | 3.0 | — | — | — | 5.5 | 4.2 | — | 0.18 | 0.015 | 0.06 | — |
| IN-100 | 60 | 10.0 | 15.0 | 3.0 | — | — | — | 5.5 | 4.7 | — | 0.18 | 0.014 | 0.06 | 1.0 V |

*Cb = Ta

What is claimed is:

1. A process of refurbishing a superalloy casting comprising the steps of
   generating a plasma arc between an electrode and a section of the casting to be refurbished under an electric current of less than 30 amps to melt a surface of said section into a shallow pool of molten metal without detrimentally heating the casting;
   delivering a controlled amount of welding powder of the same composition as the superalloy casting into said arc at a point slightly above said molten pool for heating and delivery to said molten pool; and
   subsequently solidifying the delivered powder and molten pool into an overlay, having a high integrity cast structure metallurgically bonded to said casting and being of the same composition as the casting.

2. A method as set forth in claim 1 which further comprises the step of entraining the welding powder in a carrier gas for delivery into said arc and shielding said arc with inert gas to protect said pool from contamination.

3. A method as set forth in claim 1 wherein the electric current is supplied by a constant current power supply with a frequency response of 500 Hz or greater.

4. A method as set forth in claim 1 wherein the electric current is pulsed between a main current level and a lower auxiliary current level with said main current level being sufficient to form said molten pool and to fuse the delivered powder and said auxiliary current level being sufficient to permit solidification of said pool and melted powder to form the overlay.

5. A method as set forth in claim 4 wherein said current pulses have a duration of from 10 to 40 milliseconds and the average current level in the range of from 3 to 20 amps.

6. A method as set forth in claim 1 wherein said amperage is in a range of from 0.5 to 30 amps.

7. A method as set forth in claim 1 wherein said section of the casting is characterized in being a crack.

8. A method as set forth in claim 1 wherein said section of the casting is characterized in being undersized relative to the remainder of the casting.

9. A process of refurbishing a superalloy casting comprising the steps of
generating a plasma arc between an electrode and a section of a casting of nickel-base superalloy material primarily strengthened by precipitation of a gamma prime phase, $Ni_3$ (Al, Ti) to be refurbished under a electric current to melt a surface of said section into a shallow pool of molten metal without detrimentally heating the casting;
delivering a controlled amount of welding powder of the same composition as the casting into said arc at a point slightly above said molten pool for heating and delivery to said molten pool; and
subsequently solidifying the delivered powder and molten pool into an overlay having a high integrity cast structure metallurgically bonded to said casting and a high temperature strength for use in hot section structural applications.

10. A process of refurbishing a superalloy casting comprising the steps of
generating a plasma arc between an electrode and a section of casting made of IN713C under an electric current of less than 30 amps to melt a surface of said section into a shallow pool of molten metal without detrimentally heating the casting;
delivering a controlled amount of welding powder selected from the group consisting of IN713C and IN713LC into said arc at a point slightly above said molten pool for heating and delivery to said molten pool; and
subsequently solidifying the delivered powder and molten pool into an overlay, having a high integrity cast structure, metallurgically bonded to said casting.

11. A process of refurbishing a superalloy casting comprising the steps of
generating a plasma arc between an electrode and a section of a casting made of one of IN713C, IN738LC, IN100 and Rene 77 under an electric current of less than 30 amps to melt a surface of said section into a shallow pool of molten metal without detrimentally heating the casting;
delivering a controlled amount of welding powder of the same composition as the casting into said arc at a point slightly above said molten pool for heating and delivery to said molten pool; and
subsequently solidifying the delivered powder and molten pool into an overlay, in having a high integrity cast structure, metallurgically bonded to said casting.

12. A process as set forth in claim 11 wherein said casting is made of IN713C and said powder is a modified version of IN713C with certain elements thereof that cause cracking sensitivity reduced to lower levels.

* * * * *

UNITED STATES PATENT AND TRADEMARK OFFICE
CERTIFICATE OF CORRECTION

PATENT NO. : 4,878,953

DATED : Nov. 7, 1989

INVENTOR(S) : GILBERT A. SALTZMAN, et al

It is certified that error appears in the above-identified patent and that said Letters Patent is hereby corrected as shown below:

```
Column 2, line 1 "or" should be -of-
Column 3, line 54 "of a gas" should be -of gas-
Column 5, line 27 "the can" should be -the plasma arc 12
  and the position of the heat input to the vane 10 can-
Column 7, line 48 "weld bead" should be -weld metal, but which
  requires very precise control over the weld bead-
Column 8, line 60 "overlay," should be -overlay-
Column 9, line 19 "being" should be -having-
Column 9, line 29 "a electric" should be -an electric-
Column 10, line 16 "overlay," should be -overlay-
Column 10, line 32 'overlay, in having" should be -overlay
  having-
```

Signed and Sealed this

First Day of January, 1991

Attest:

HARRY F. MANBECK, JR.

*Attesting Officer*     *Commissioner of Patents and Trademarks*